United States Patent Office 2,695,632
Patented Nov. 30, 1954

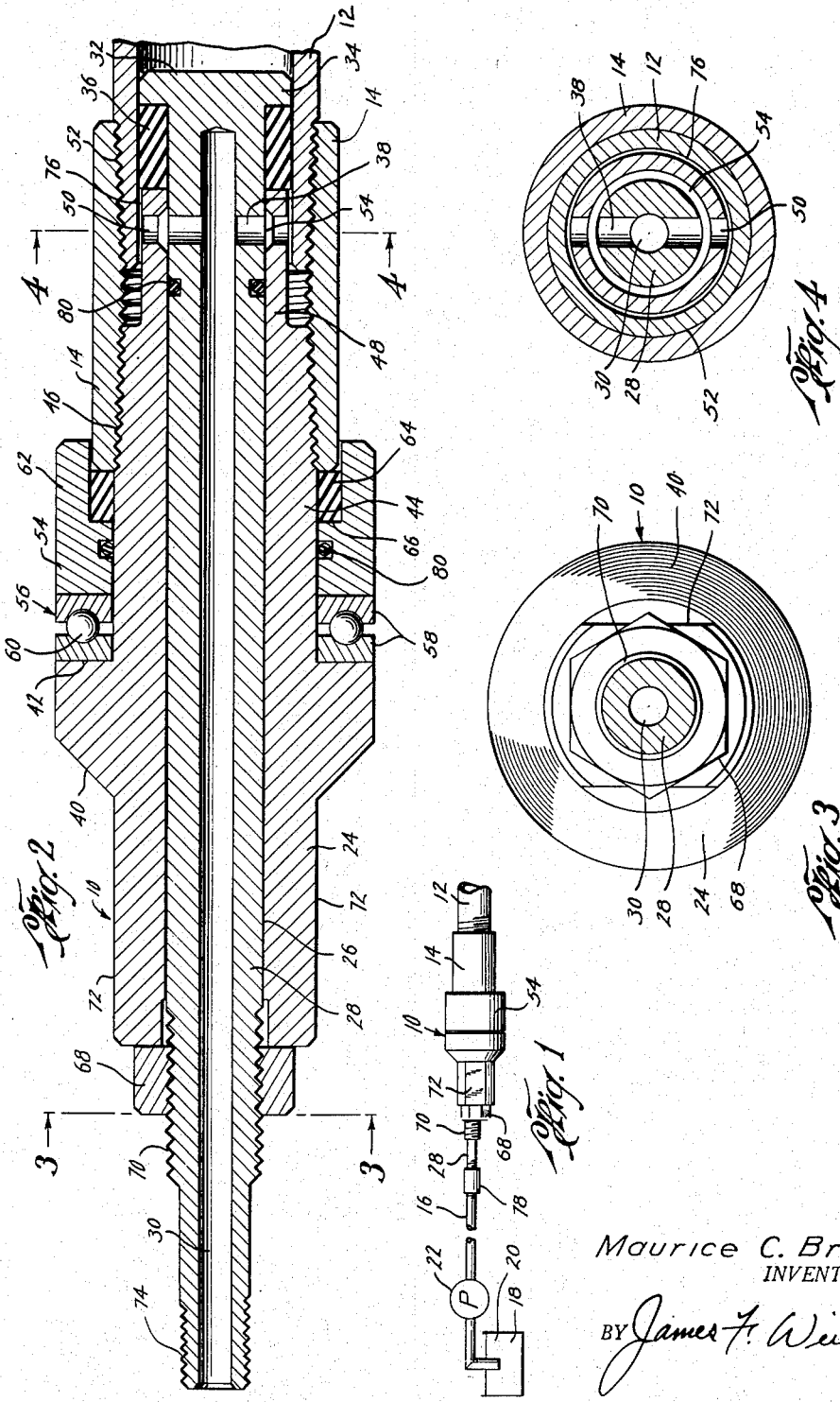

2,695,632
COUPLING TESTER

Maurice C. Brock, Houston, Tex., assignor to Houston Oil Field Material Company, Inc., Houston, Tex., a corporation of Delaware Application March 26, 1951, Serial No. 217,655

6 Claims. (Cl. 138—90)

This invention relates to a method and apparatus for testing pipe and tube joints, couplings and the like.

In the petroleum and other industries lengths of pipe or tubing are threaded together by means of tool joints or couplings which are threaded or otherwise secured to such lengths of pipe or tubing. In testing such joints or couplings for leakage it has been the practice to seal the entire length of pipe by providing seals at each end and to pump fluid, ordinarily water, into such lengths of pipe under pressure and to maintain such fluid under pressure in the lengths of pipe for a desired interval of time.

It is an object of the present invention to provide a method and means to selectively test only the connection securing the coupling or tool joint to a length of pipe or tubing by which the lengths of pipe or tubing may be threaded or otherwise secured together.

A further object of the present invention is the provision of a method and means to selectively test the connection between a coupling or tool joint and a length of pipe and to seal off the remainder of the pipe from the connection being tested.

A further object of the present invention is the provision of a method and means to test tool joints and couplings and the like in which a minimum of materials and equipment are used and which require less time than methods and means now employed by the trade.

A still further object of the present invention is the provision of a coupling tester which is simple in construction, of relatively few parts, which is easily and inexpensively manufactured, may be easily and readily transported, and which is rugged and durable in use, but which may be easily repaired or parts replaced when necessary.

Other and further objects and features will be apparent from the following description of an embodiment of my invention, which is by way of example for the purpose of disclosure, taken in connection with the accompanying drawing wherein like character references designate like parts throughout the several views and where Fig. 1 is a diagrammatic illustration of apparatus constructed in accordance with the invention and which illustrates apparatus suitable for use in the method of selectively testing connections for couplings and tool joints and the like, Fig. 2 is an enlarged side elevation in section of the coupling tester illustrated in Fig. 1 and Figs. 3 and 4 are cross-sectional views taken along the lines 3—3 and 4—4 respectively of Fig. 2.

Broadly, the method comprises sealing a pipe or tubing internally adjacent a coupling secured to an end thereof, sealing an end of the coupling so secured to such pipe or tubing, and providing fluid under desired pressure between such sealed portions to determine whether or not leakage of fluid pressure occurs in the connection of the coupling or tool joint to the pipe or tubing. A liquid, such as water, is satisfactory as the fluid and pressures and time intervals of maintaining the fluid under pressure will vary with the particular type of pipe or tubing and the uses to which it is to be put.

Referring to the drawing, and particularly Fig. 1, a coupling or tool joint tester constructed in accordance with the invention is indicated generally by the reference numeral 10 secured to the pipe 12 and coupling 14, which in turn is threaded to the pipe 12. A hose or other conduit 16 is secured to the other end of the coupling tester 10 through which fluid, such as water 18 from the container 20 is pumped by means of the pump 22 under desired pressure. The pump 22 may be of any conventional type and, as indicated before, any suitable fluid may be utilized for the purpose. The hose or conduit 16 may be of any conventional type and ordinarily is of the flexible type of hose.

Referring now more particularly to the coupling or tool joint tester constructed in accordance with the invention, as illustrated in Fig. 2, the tester 10 has the tubular body member 24 having the axial bore 26 extending throughout its length. A mandrel 28 is positioned in the axial bore 26, and the former has the axial passage 30 extending substantially its length, but closed at its inner end 32. The inner end 32 of the mandrel 28 is enlarged to provide a circumferential flange 34 against which the packing 36 seats. As illustrated, the packing is preferably in the form of a tubular member disposed about the inner end of the mandrel 28 seating against the annular shoulder provided by the circumferential flange 34. This packing or sealing 36 may be of any suitable material such as rubber, fabric and the like and may be of any conventional form known to the trade.

A plurality of radial ports 38 are drilled in the mandrel 28 adjacent the packing 36. As better illustrated in Fig. 4, only two such apertures or ports 38 have been provided, but it will be understood that any desired number may be provided for the purpose.

The body 24 of the tester 10 has the diverging circumferential shoulder 40 to provide the annular stop shoulder 42, the body 24 being reduced as at 44. Intermediate the ends of the reduced portion 44 of the body 24 is a threaded area 46 by which the tester 10 may be threaded to the coupling 14. The threaded area 46 permits the tester 10 to be securely threaded to the coupling 14 and the body 44 has the reduced circumferential end portion 48 which extends into the coupling 14 when the device 10 is threaded to the coupling. The reduced portion 48 has the radial ports 50 drilled therein through which fluid pressure is provided to the connection 52 of the coupling 14 and the pipe 12. While any number of ports or apertures 50 may be utilized, two have been found satisfactory and, preferably, an annular recess 54 is provided interiorly of the end 36 of the body 24, which channel or recess communicates with the ports 50, all as better seen in Fig. 4, in order that fluid under pressure in the axial bore 30 of the mandrel 28 and ports 38 thereof will be communicated and flow through the ports 50 and be applied to the connection 52 between the coupling 14 and the pipe 12.

A tubular body member 54 is rotatably secured to the body 24 and abuts the shoulder 42 by means of the thrust bearing assembly generally indicated by the numeral 56. The thrust bearing or anti-friction assembly may be of any conventional type, and, as illustrated, may comprise two annular rings 58 providing a race for the anti-friction bearings 60. Thus the member 54 is freely rotatable about the body 24 at all times.

The member 54 has the depending annular flange portion or skirt 62 which is adapted to fit down over the upper end of the coupling 14 and suitable packing 64 is disposed in the interior of the skirt portion 62 which stops against the shoulder 66 formed interiorly of the skirt or circumferential flange 62. The packing 64 may be of any suitable material, such as rubber, fabric and the like. Thus a seal is provided at the upper end of the coupling 14 and interiorly of the pipe 12 proximate the connection 52 of the coupling 14 with the pipe 12 when the tester 10 is in operative position.

In order that the packing may be compressed into sealing engagement with the interior of the pipe 12 and the end of the coupling 14, a nut 68 is threaded to the mandrel 28 at its outer end, as at 70, and a pair of flats 72 are provided on the body 24, all as better seen in Fig. 3. Thus the tester 10 may be threaded to the coupling 14 by means of rotating the entire device by engaging a tool, not shown, to the flats 72. As the tester 72 is threaded into position, the skirt member 54 will remain fixed upon engagement of the packing 64 with the end of the coupling 14. As the tester 10 is threaded to the coupling 14 the packing 64 will be compressed and provide a seal for the upper end of the coupling 14. Thereafter, the nut 68 may be tightened thereby providing relatively longitudinal movement of the mandrel 28 and the body 24, the tightening of the nut compressing the packing 36 into sealing engagement with the interior of the pipe 12. The tester is now in position to test the connection of the coupling and the pipe and, as illustrated, in connection with Fig. 1, a flexible hose or conduit 16 is secured to the mandrel 30 at the threaded portion 74 (see Fig. 2) and fluid 18 under pressure is pumped from the container 20 by means of the pump 22 through the axial bore 30 into the ports 38, the channel 54 and the ports 50 into the annular space 76 between the body 48 and the interior of the end of the pipe 12. While any desired pressure and interval of time may be maintained for testing the coupling connection, pressures up to 9000 pounds per square inch have been satisfactory for pipe or tubing for use in connection with the drilling of oil wells and the like.

After the test has been completed, the pressure may be released, the nut 68 loosened and the tester unthreaded from the coupling by means of engaging the flats 72 with a suitable wrench (not shown). Ordinarily in testing successive couplings the conduit 16 will not be disconnected from the tester and, a swivel connection generally indicated by the reference numeral 78 is provided. No detailed description thereof is deemed necessary inasmuch as such a connection is conventional and is in widespread use in connection with a variety of apparatus and devices.

It seems manifest that many changes may be made in a coupling tester constructed in accordance with the invention. For example, the skirt member 54 and co-acting seal ring 64 and anti-friction assembly 62 may be eliminated, in which event sealing the upper end of the coupling 14 would depend upon proper makeup of the tester 10 therewith. Manifestly, however, the arrangement described in connection with the drawings is preferable to avoid excessive time in threading the tester to the coupling and possible fouling and galling of threads. If desired, the ports 38 and 54 may be drilled in alignment and the mandrel 28 keyed to the body 10. Again, such an arrangement, however, while having utility, would be more expensive than the arrangement illustrated.

It will be noted that the respective parts are further packed off with suitable packings, such as the O-rings 80. While the invention is described in connection with threaded couplings, it is manifest that by simple adaptation the tester may be utilized with couplings which are not of the threaded type. Thus while only one embodiment of the invention is illustrated in the drawing, it is manifest that many changes may be made in the details of construction and arrangement of parts and that the invention is of wide application and scope. Accordingly, the invention will be limited only by the scope of the appended claims.

What is claimed is:

1. An apparatus for testing tool joints, couplings and the like secured to pipe comprising a body having an axial bore, a mandrel having an axial bore closed at one end slidable in said body, a packing assembly disposed on said mandrel adjacent its closed end adapted to sealingly engage interior walls of such pipe proximate an end thereof, such packing assembly being actuated by relative movement of said mandrel and body, means to move said mandrel relative to such body, communicating ports in such mandrel and body adjacent such packing assembly adapted to communicate fluid pressure to a connection securing a tool joint to such pipe, and a second packing assembly secured to such body adapted to engage and seal the free end of such tool joint upon securing the body to such tool joint.

2. An apparatus for testing tool joints, couplings and the like secured to pipe comprising, a body having an axial bore, a mandrel having an axial bore closed at one end slidable in said body, first packing means disposed on said mandrel adjacent its closed end adapted to sealingly engage interior walls of such pipe proximate an end thereof, such first packing means being actuated by relative movement of said mandrel and body, means to move said mandrel relative to such body, communicating ports in such mandrel and body adjacent such packing means adapted to communicate fluid pressure to a connection securing a tool joint to such pipe, second packing means on said body to sealingly engage the free end of such tool joint upon securing the body to such free end, and means to permit rotation between such body and said second packing means.

3. An apparatus for testing tool joints, couplings and the like secured to pipe comprising, a body having an axial bore throughout its length, a mandrel movable in said body and extending at each end beyond such body, said mandrel having an axial bore closed at one end and open at another end, a circumferential projection on the closed end of such mandrel adapted to extend into the pipe and coupling connection to be tested, first packing on said mandrel adjacent such projection, such first packing adapted to be expanded between said projection and an end of the body upon manipulation of said mandrel, a tubular member rotatably secured to the external periphery of said body, said tubular member having an annular flange extending from the periphery of the tubular member toward the first packing, second packing disposed on such body and under said annular flange adapted to engage the free end of such coupling, means to move said mandrel to expand and contract said first mentioned packing, means to secure the body to the coupling and thereby compress said second packing into sealing engagement with the coupling, means on the open end of such mandrel to establish a connection with a supply of fluid pressure, and co-acting ports in such body and mandrel adapted to permit the application of such fluid pressure to sealed portions of such pipe and coupling.

4. An apparatus for testing tool joints, couplings and the like secured to pipe comprising, a body having an axial bore, a mandrel having an axial bore closed at one end slidable in said body, first packing means disposed on said mandrel adjacent its closed end adapted to sealingly engage interior walls of such pipe proximate an end thereof, such first packing means being actuated by relative movement of said mandrel and body, means to move said mandrel relative to said body, communicating ports in such mandrel and body adjacent such first packing means adapted to communicate fluid pressure to a connection securing a tool joint to such pipe, thread means on such body adapted to thread the body to such tool joint, second packing means on said body to sealingly engage the free end of such tool joint upon threading the body to such free end, and means to permit rotation between such body and said second packing means.

5. An apparatus for testing tool joints, couplings and the like secured to pipe comprising, a body having an axial bore, a mandrel having an axial bore closed at one end movably threaded in said body, first packing means disposed on said mandrel adjacent its closed end adapted to sealingly engage interior walls of such pipe proximate an end thereof, such packing means being actuated by relative movement of said mandrel and body, communicating ports in such mandrel and body adjacent such packing means adapted to communicate fluid pressure to a connection securing a tool joint to such pipe, thread means on said body adapted to threadedly secure said body to such tool joint, second packing means on said body to sealingly engage the free end of such tool joint upon threading the body to such tool joint, and means to permit rotation between such body and said second packing means.

6. An apparatus for testing tool joints, couplings and the like secured to pipe comprising, a body having an axial bore throughout its length, a mandrel movable in said body and extending at each end beyond such body, such mandrel having an axial bore closed at one end and open at another end, a circumferential projection on the closed end of such mandrel adapted to extend into the pipe and coupling connection to be tested, first packing on said mandrel adjacent such projection, such first packing adapted to be expanded between said projection and an end of the body upon manipulation of said mandrel, a tubular member rotatably secured to the external periphery of said body, said tubular member having an annular flange extending from the periphery of the tubular member toward the first packing, second packing disposed on such body and under said annular flange adapted to engage the free end of such coupling, means to move said mandrel to expand and contract said first mentioned packing, thread means on the body to secure the body to the coupling and thereby compress said second packing into sealing engagement with the coupling, means on the open end of such mandrel to establish a connection with a supply of fluid pressure, and co-acting ports in such body and such mandrel adapted to permit the application of such fluid pressure to sealed portions of such pipe and coupling.

References Cited in the file of this patent

UNITED STATES PATENTS

| Number | Name | Date |
|---|---|---|
| 1,059,053 | Lennon | Apr. 15, 1913 |
| 1,600,137 | Randolph | Sept. 14, 1926 |
| 2,155,602 | Keulers | Apr. 25, 1939 |
| 2,241,526 | Rosenkranz | May 13, 1941 |
| 2,246,885 | Jones | June 24, 1941 |
| 2,342,616 | Obrien | Feb. 22, 1944 |
| 2,579,972 | Scheiwer | Dec. 25, 1951 |

FOREIGN PATENTS

| Number | Country | Date |
|---|---|---|
| 319,889 | Great Britain | Oct. 3, 1929 |